United States Patent [19]

Nagase et al.

[11] Patent Number: 4,763,630
[45] Date of Patent: Aug. 16, 1988

[54] METHOD OF AND SYSTEM FOR CONTROLLING INJECTION TIMING IN DIESEL ENGINE

[75] Inventors: Masaomi Nagase; Fumiaki Kobayashi; Yoshiyasu Ito, all of Toyota, Japan

[73] Assignee: Toyota Jidosha Kabushiki Kaisha, Japan

[21] Appl. No.: 836,078

[22] Filed: Mar. 4, 1986

[30] Foreign Application Priority Data

Mar. 4, 1985 [JP] Japan .................................. 60-42141

[51] Int. Cl.⁴ ............................................ F02M 39/00
[52] U.S. Cl. .................................... 123/501; 123/479; 123/198 D; 123/357
[58] Field of Search ........... 123/500, 501, 502, 198 D, 123/179 L, 479

[56] References Cited

U.S. PATENT DOCUMENTS

| | | | |
|---|---|---|---|
| 4,450,817 | 5/1984 | Ibuki | 123/501 |
| 4,463,729 | 8/1984 | Bullis et al. | 123/478 |
| 4,503,830 | 5/1985 | Nakamura | 123/501 |
| 4,522,168 | 6/1985 | Ogawa | 123/357 |
| 4,534,328 | 8/1985 | Fischer | 123/198 D |
| 4,541,392 | 9/1985 | Ogino | 123/357 |
| 4,589,391 | 5/1986 | Sieber | 123/501 |
| 4,596,221 | 6/1986 | Ament | 123/501 |
| 4,598,680 | 7/1986 | Lanfer | 123/501 |
| 4,617,902 | 10/1986 | Hirano | 123/501 |
| 4,633,842 | 1/1987 | Ikeda | 123/501 |
| 4,643,154 | 2/1987 | Matsuno | 123/501 |

FOREIGN PATENT DOCUMENTS

| | | | |
|---|---|---|---|
| 3444767 | 8/1985 | Fed. Rep. of Germany | 123/501 |
| 0093933 | 5/1984 | Japan | 123/501 |
| 2091000 | 7/1982 | United Kingdom | 123/501 |

Primary Examiner—Carl Stuart Miller
Attorney, Agent, or Firm—Parkhurst & Oliff

[57] ABSTRACT

In controlling ignition timing in accordance with a deviation between a target ignition timing determined on the basis of at least an engine load and an engine speed and an actual ignition timing detected by use of an ignition timing sensor, when non-perfect explosion operating conditions, wherein an ignition signal is difficult to detect, or operating conditions in which the ignition signal is instable are present, an open loop control on the basis of the engine load and the engine speed is effected. Feedback control is effected when the ignition signal is detected with neither non-perfect explosion operating conditions nor instable ignition signal operating conditions being present. When the ignition signal is not detected, the aforesaid open loop control is effected and a trouble in the ignition timing sensor is detected.

8 Claims, 5 Drawing Sheets

METHOD OF AND SYSTEM FOR CONTROLLING INJECTION TIMING IN DIESEL ENGINE

BACKGROUND OF THE INVENTION

1. Field of the Invention

This invention relates to a method of and a system for controlling injection timing in a diesel engine, and more particularly to improvements in a method of and a system for controlling injection timing in a diesel engine, suitable for use in an electronically controlled motor vehicle diesel engine having an ignition timing sensor, wherein the injection timing is feedback-controlled in accordance with a deviation between a target ignition timing, determined on the basis of an engine load and an engine speed, and an actual ignition timing, detected by an ignition timing sensor.

2. Description of the Prior Art

Japanese Patent Laid-Open Nos. 28842/1982, 192935/1983, 153942/1984 and U.S. Pat. No. 4,463,729 disclose that when controlling injection timing to optimize the exhaust gas purifying performance and the like of a diesel engine, particularly for diesel engine for a motor vehicle, the use of an ignition timing sensor, such as a flame sensor installed in a combustion chamber, results in the detection of ignition timing, that is, a timing at which pressure in a cylinder rapidly rises by combustion, or a timing at which a light of combustion by ignition rises. The ignition timing is detected in a combustion chamber by the ignition timing sensor and is fed back so that the actual ignition timing becomes a required ignition timing as determined by an engine load, an engine speed and the like. By feedback-controlling the injection timing in response to an output from the ignition timing sensor as described above, a wave form signal from the ignition timing sensor is shaped by a predetermined threshold value Vth and an actual ignition timing is calculated from a difference between the ignition signal and a reference position, such as top dead center (TDC).

When the ignition timing sensor malfunctions due to a disconnection or the like and no ignition signal is outputted, the applicant has proposed in Japanese patent application Nos. 205248/1983 and 82386/1983 that by monitoring the presence of an ignition signal outputted from the ignition timing sensor and detecting the absence of an ignition signal within a preset time period, an open loop control is effected in response to an injection start timing signal, as disclosed in Japanese patent application No. 205248/1983, and a fuel injection timing set on the basis of an engine speed and an engine load, as disclosed in Japanese patent application No. 82386/1983.

However, since the ignition timing sensor has its forward end face exposed to an engine combustion chamber, during operating conditions at low temperature or at low speed and high load, carbon may adhere to the glass front end face at the forward end of the ignition timing sensor. In that case, an output from the ignition timing sensor is lowered considerably, and, in the extreme case, no ignition signal may be outputted.

As a result, in order to accurately judge the presence of an ignition signal, it is necessary to judge the presence of an ignition signal in a specific region wherein the ignition signal is stable. Therefore, since there is a possibility that the ignition timing sensor smolders during the idling of the engine, at a time of low engine rotation or at a time of low engine load, the presence of an ignition signal and trouble in the ignition timing sensor cannot be detected. Therefore, injection timing is controlled by a maximum spark advance or a maximum spark lag, thus presenting such disadvantages as increased diesel knocking and increased white smoke.

Furthermore, if the presence of a malfunction is mistakenly judged during conditions in which the ignition signal is instable, fail safe controls such as trouble diagnosis, trouble display and decreased fuel quantity are effected. In smoldering conditions in which carbon adheres, it becomes difficult to effect the feedback control in response to an ignition signal. However, it is possible to effect control of the ignition timing by the open loop control in response to a basic injection timing determined from an engine speed, an acceleration opening and the like, whereby there is no need to effect fail safe controls as is necessary when the ignition timing sensor malfunctions. Furthermore, since the smoldering can be overcome by high engine rotation, there is no need to annoy a vehicle driver with a trouble display.

SUMMARY OF THE INVENTION

The present invention has been developed to obviate the above-described disadvantages of the prior art and has as an object, the provision of a method of and a system for controlling an injection timing in a diesel engine, wherein a feedback control or an open loop control of the injection timing and detection of trouble in an ignition timing sensor can be precisely performed. Consequently, controllability and driveability when, in particular, no ignition signal is detected are improved and abnormal conditions of the ignition timing sensor can be accurately detected.

Figure 1:
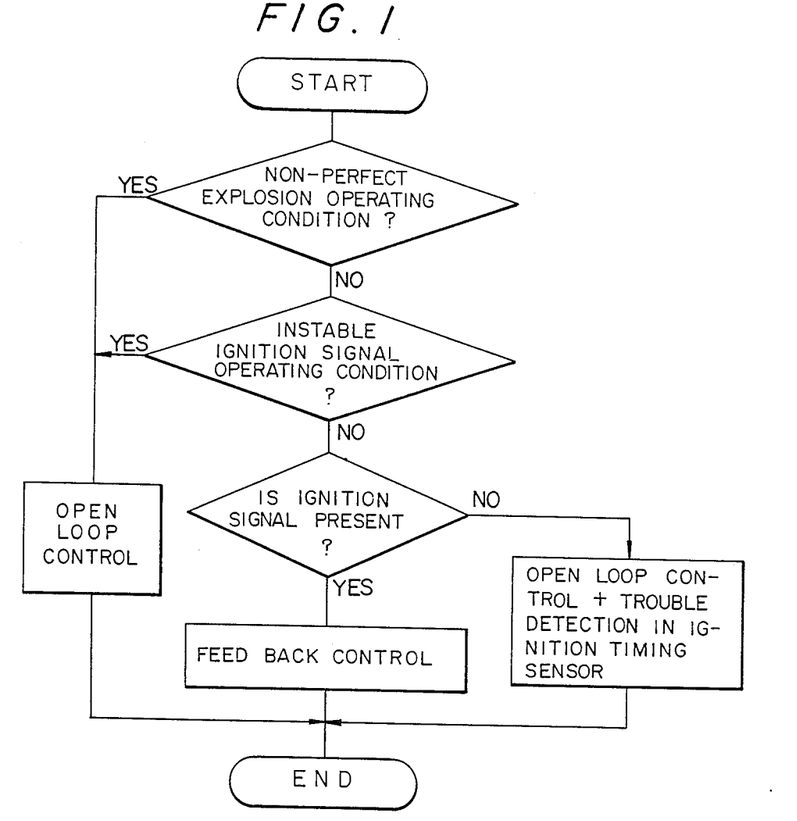
FIG. 1 is a flow chart showing the gist of the method of controlling an injection timing in a diesel engine according to the present invention.

To this end, the present invention contemplates a method of controlling injection timing in a diesel engine, wherein the injection timing is feedback-controlled in accordance with a deviation between a target ignition timing determined on the basis of at least an engine load and an engine speed, and an actual ignition timing, detected by use of an ignition timing sensor, including as shown in FIG. 1:

- a step of detecting the presence of non-perfect explosion operating conditions, wherein the detection of an ignition signal is difficult;
- a step of analyzing operating conditions when the ignition signal is instable;
- a step of effecting an open loop control based on the engine load and the engine speed when non-perfect explosion operating conditions or the instable ignition signal operating conditions are present;
- a step of effecting the feedback-control in response to the ignition signal when the ignition signal is detected under perfect explosion operating conditions and stable ignition signal operating conditions; and
- a step of effecting open loop control when no ignition signal is detected under perfect explosion operating conditions and stable ignition signal operating conditions, and detecting malfunctions in the ignition timing sensor.

A specific embodiment of the present invention is of such an arrangement that non-perfect explosion operating conditions are present during extremely low engine rotation and the starting time of the engine, so that the non-perfect explosion operating conditions can be readily and precisely judged.

Another specific embodiment of the present invnention is of such an arrangement that the time of extremely low engine rotation includes an engine stall time, so that a proper control can also be effected during the engine stall time.

A further specific embodiment of the present invention is of such an arrangement that the instable ignition signal operating conditions include the time of deceleration, the time of low rotation and the time of low engine load, so that the instable ignition signal operating conditions can be readily and precisely judged.

A still further specific embodiment of the present invention is of such an arrangement that the time of deceleration occurs when the engine speed is higher than a preset value exceeding the idle speed and the fuel injection quantity is lower than a preset value close to no load, so that the time of deceleration can be readily and precisely judged.

A still further specific embodiment of the present invention is of such an arrangement that the ignition signal detecting time occurs at an interval of less than a preset time, so that the presence of the ignition signal detection can be precisely judged.

A yet further specific embodiment of the present invention is of such an arrangement that a judgment as to whether a malfunction of the ignition timing sensor is present or not also determines whether the trouble continues beyond a preset time period or not, so that the judgment of the malfunction can be precisely performed.

A yet further specific embodiment of the present invention is of such an arrangement that the aforesaid preset time period is made variable in accordance with a history of the operating conditions of the engine, so that the judgment of a malfunction can be more precisely performed.

According to the present invention, the open loop control of the injection timing in a diesel engine in accordance with a deviation between the target ignition timing, determined on the basis of at least the engine load and the engine speed, and the actual ignition timing detected by an ignition timing sensor, is effected under the presence of non-perfect explosion operating conditions or instable ignition operating conditions, which cause difficult ignition signal detection. When the ignition signal is properly detected under perfect explosion operating conditions and stable ignition signal operating conditions, the aforesaid feedback-control in response to the ignition signal is effected. When the ignition signal is not detected, the aforesaid open loop control is effected indicating a malfunction of the ignition timing sensor. As a consequence, the feedback-control or the open loop control can be properly and precisely effected, whereby the mistaken control of the ignition timing due to the mistaken detection of the ignition timing, the turbulence of the ignition wave form, such as an output power drop or cracked wave form, and the absence of the ignition signal is avoided. Particularly, when the ignition signal is absent, the open loop control can be reliably effected, so that white smoke and diesel knocking can be avoided, improving the driveability and the fuel consumption performance of the engine. Further, trouble in the ignition timing sensor is detected only in stable ignition signal operating conditions, so that mistaken detection of trouble in the ignition timing sensor is avoided.

BRIEF DESCRIPTION OF THE DRAWINGS

The exact nature of this invention, as well as other objects and advantages thereof, will be readily apparent from consideration of the following specification relating to the accompanying drawings, of which.

DESCRIPTION OF THE PREFERRED EMBODIMENTS

Detailed description will hereunder be given of an embodiment of the electronically controlled diesel engine for a motor vehicle, to which is adopted a method of controlling the injection timing according to the present invention, with reference to the drawings.

Figure 2:
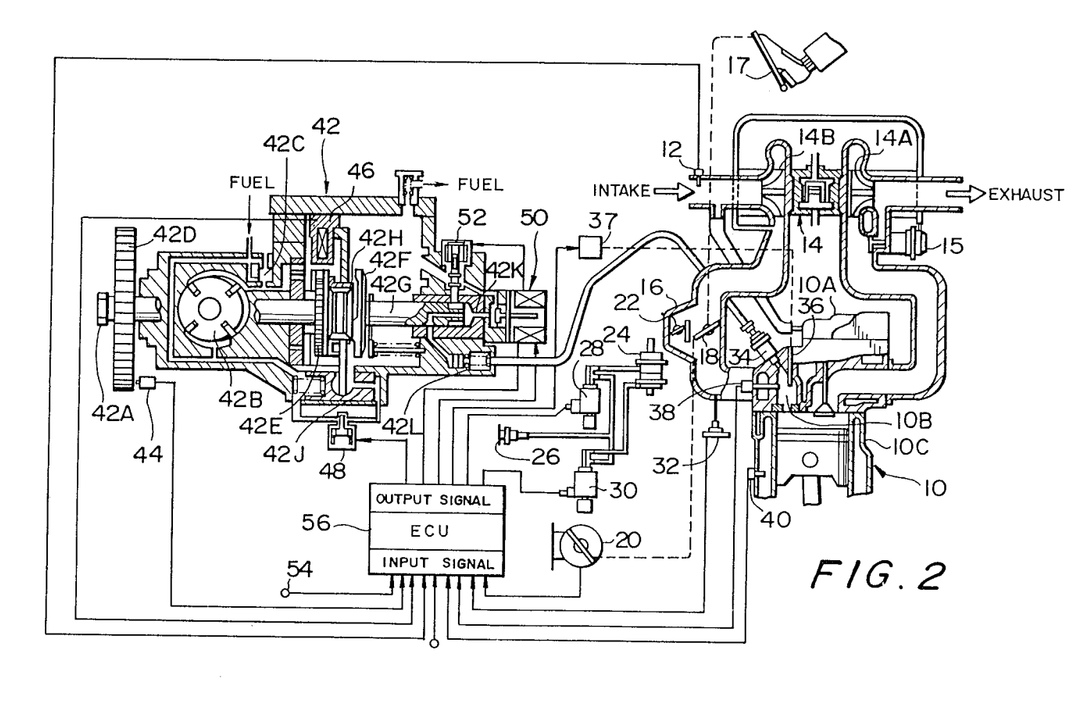
FIG. 2 is a sectional view, partially including a block diagram, showing the general arrangement of an embodiment of an electronically controlled diesel engine for a motor vehicle, to which is adopted the present invention.

FIG. 2 shows an embodiment of the present invention in which an intake-air temperature sensor 12 for detecting intake-air temperature is provided at the downstream side of an air cleaner, not shown. Provided at the downstream side of the intake-air temperature sensor 12 is a turbo charger 14 including a turbine 14A rotatable by heat energy of the exhaust gas and compressor 14B rotatable in operational association with this turbine 14A. The upstream side of the turbine 14A of the turbocharger 14 and the downstream side of the compressor 14B communicate with each other through a waste gate valve 15 to prevent intake-air pressure from being raised excessively high.

Provided in a venturi 16 disposed at the downstream side of the compressor 14B is a main intake-air throttle valve 18 rotatable non-linearly in operational association with an accelerator pedal 17, so as to restrict an intake-air quantity during idling and the like. The opening angle Accp of the accelerator pedal 17 (hereinafter referred to as a "accelerator opening") is detected by an accelerator position sensor 20.

Provided in parallel to the main intake-air throttle valve 18 is an auxiliary intake-air throttle valve 22, the opening of which is controlled by a diaphragm device 24. Supplied to the diaphragm device 24 is a vacuum generated in a vacuum pump 26 through a vacuum switching valve (hereinafter referred to as a "VSV") 28 or 30.

Provided at the downstream side of the intake-air throttle valves 18 and 22 is an intake pressure sensor 32 for detecting intake-air pressure.

A cylinder head 10A of a diesel engine 10 is provided with an injection nozzle 34, a glow plug 36 and an ignition timing sensor 38, the forward ends of which are located in an engine combustion chamber 10B. Furthermore, provided on a cylinder block 10C of the diesel engine 10 is a water temperature sensor 40 for detecting the temperature of engine cooling water.

Glow current is supplied to the glow plug 36 through a glow relay 37.

Fuel is fed under pressure to the injection nozzle 34 from an injection pump 42. The injection pump 42 includes a driving shaft 42A rotatable in operational association with the rotation of a crankshaft of the diesel engine 10; a feed pump 42B (FIG. 2 shows a state in which the pump is developed through 90°) secured to the driving shaft 42A to pressurize the fuel; a fuel pressure regulating valve 42C for regulating fuel feed pressure; a reference position sensor 44 such as an electromagnetic pickup for detecting a reference position such as top dead center (TDC) from a displacement in rotation of a gear 42D secured to the driving shaft 42A; an engine speed sensor 46 such as an electromagnetic pickup for detecting an engine speed from a displacement in rotation of a gear 42E secured to the driving shaft 42A; a roller ring 42H for reciprocating a face cam 42F and a plunger 42G and varying the timing thereof; a timer piston 42J (FIG. 2 shows a state in which the timer piston is developed through 90°) to vary a rotary position of the roller ring 42H; a timing control valve (hereinafter referred to as a "TCV") 48 for controlling the position of the timer piston 42J to control the injection timing; an electromagnetic spill valve 50 for varying fuel relief timing from the plunger 42G through a spill port 42K to control the fuel injection quantity; a fuel cut solenoid 52 for cutting the fuel; and a delivery valve 42L for preventing back flow and after-dripping of the fuel.

Figure 3:
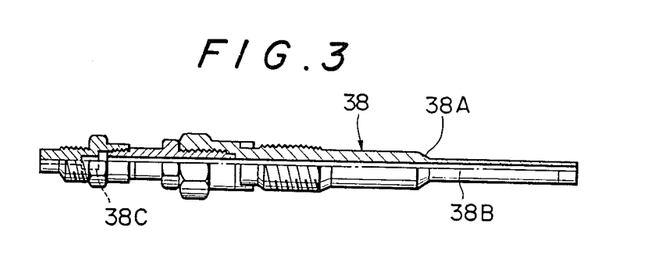
FIG. 3 is a longitudinal sectional view showing the arrangement of an ignition timing sensor used in the above embodiment.

As shown in FIG. 3, the ignition timing sensor 38 includes a tubular case 38A, inserted and fixed into the cylinder head 10A of the diesel engine 10 of FIG. 2; a light conductor 38B such as quartz glass and inserted into the central portion of the case 38A to transmit a combustion light; and a light receiving element 38C such as a silicone photodiode to detect the light transmitted by the light conductor 38B and convert the same into an electric signal.

Outputs from the intake-air temperature sensor 12, the accelerator position sensor 20, the intake pressure sensor 32, the ignition timing sensor 38, the water temperature sensor 40, the reference position sensor 44, the engine speed sensor 46, a glow current sensor 54 for detecting a glow current flowing through the glow plug 36, an air conditioner switch, a neutral safety switch and a vehicle speed signal are inputted to and processed in an electronic control unit (hereinafter referred to as an "ECU") 56. The VSV 28, 30, the glow relay 37, the TCV 48, the electromagnetic spill valve 50 and the fuel cut solenoid 52 are controlled by outputs from the ECU 56.

Figure 4:
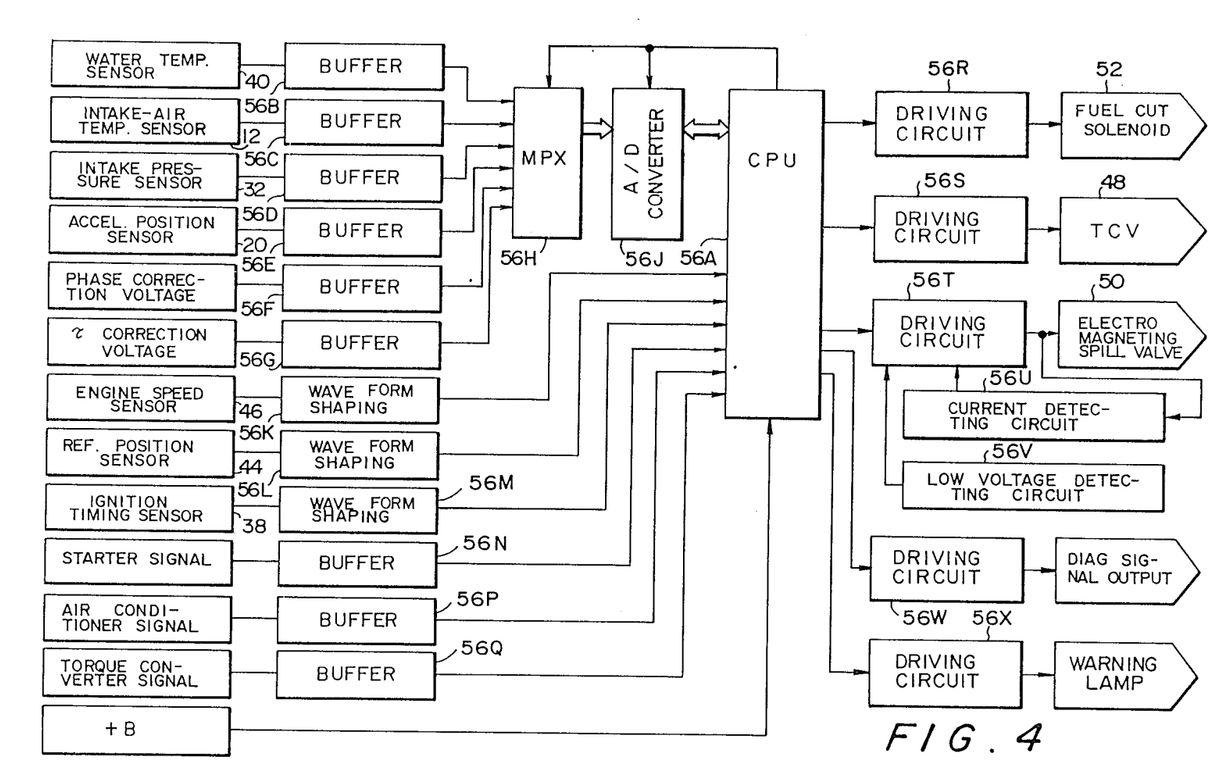
FIG. 4 is a block diagram showing the arrangement of an electronic control unit used in the above embodiment.

As shown in FIG. 4, the ECU 56 includes: a central processing unit (hereinafter referred to as a "CPU") 56A for performing various calculation processing; a multiplexer (hereinafter referred to as a "MPX") 56H for succesively taking in an output from the water temperature sensor 40, which is inputted through a buffer 56B, an output from the intake air temperature sensor 12, which is inputtted through a buffer 56C, an output from the intake pressure sensor 32, which is inputted through a buffer 56D, an output from the accelerator position sensor 20, which is inputted through a buffer 56E, a phase correction voltage signal inputted through a buffer 56F and a tau correction voltage signal inputted through a buffer 56G; an analog-digital converter (hereinafter referred to as an "A/D converter") 56J for analog signals outputted from the MPX 56H into digital signals and inputting the same into the CPU 56A; a wave form shaping circuit 56K for wave form shaping an output from the engine speed sensor 46 and inputting the same into the CPU 56A; a wave form shaping circuit 56L for wave form shaping an output from the reference position sensor 44 and inputting the same into the CPU 56A; a wave form shaping circuit 56M for wave form shaping an output from the ignition timing sensor 38 and inputting the same into the CPU 56A; a buffer 56N for inputting a starter signal into the CPU 56A; a buffer 56P for inputting an air conditioner signal into the CPU 56A; a buffer 56Q for inputting a torque converter signal into the CPU 56A; a driving circuit 56R for driving the fuel cut solenoid 52 in accordance with the result of calculations by the CPU 56A; a driving circuit 56S for driving the TCV 48 in accordance with the result of calculations by the CPU 56A; a driving circuit 56T for driving the electromagnetic spill valve 50 in accordance with the result of calculations by the CPU 56A; a current detecting circuit 56U for detecting a current flowing through the electromagnetic spill valve 50 and feeding-back the same to the driving circuit 56T; a low voltage detecting circuit 56V for detecting a low voltage and inputting the same into the driving circuit 56T; a driving circuit 56W for outputting a self diagnosis signal (hereinafter referred to as a "diag signal") in accordance with the result of calculations by the CPU 56A; and a driving circuit 56X for driving a warning lamp in accordance with the result of calculations by the CPU 56A.

The aforesaid phase correction voltage signal is the signal for correcting a phase difference occuring when the reference position sensor 44 is mounted to the injection pump 42. Furthermore, the aforesaid tau correction voltage signal is the signal for correcting a deviation in responsiveness due to differences between individual parts in the injection pump 42.

Description will hereunder be given of action of one embodiment.

Figure 5:
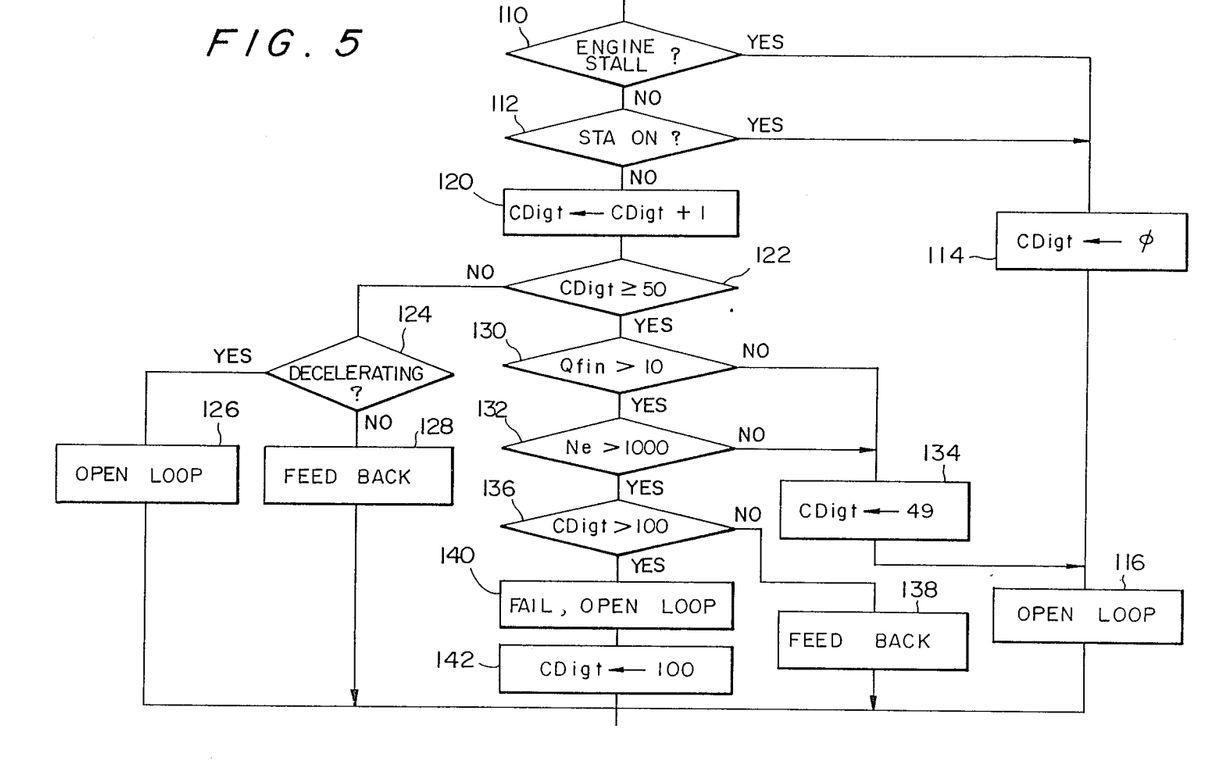
FIG. 5 is a flow chart showing a routine for controlling the injection timing according to the present invention.

In the preferred embodiment, the injection timing control is carried out in accordance with the flow chart shown in FIG. 5. Specifically, upon every lapse of a predetermined time duration, e.g. 10 milliseconds, the routine proceeds to Step 110, in which a judgment is made as to whether or not the lapse occurs during a period of extremely low engine rotation, such as during an engine stall. If not, the routine proceeds to Step 112, in which a detecmination is made as to whether or not the lapse occurs when the engine is starting, wherein a starter signal STA is ON. When the result of judgment in either Step 110 or 112 is positive, indicating that the engine is in an extremely low rotation region such as during engine stall or engine starting, region C of FIG. 6, and it is judged that the ignition signal is not stable, the routine proceeds to Step 114, in which a trouble detecting counter CDigt of the ignition timing sensor 38 is cleared. Subsequently, the routine proceeds to Step 116, in which an open loop flag is set and the open loop control is indicated, thus completing the routine. As a consequence, when the engine is in the extremely low rotation region or during the time of starting, in which the ignition signal is not stable, the open loop control is positively effected. Additionally, during the time of starting where the result of Step 112 is positive, the open loop control for the time of starting is effected. When the result of judgement in the Step 112 is negative, that is, the engine is neither in the extremely low rotation region nor in the time of starting, the routine proceeds to Step 120, whierein the trouble detecting counter CDigt is incremented. This trouble detecting counter CDigt is cleared by interrupt processing of the ignition.

Subsequently, the routine proceeds to Step 122, wherein a judgment is made as to whether a value of the trouble detecting counter CDigt exceeds a preset value, such as 50 corresponding to 500 milliseconds or not. When the result of this judgment is negative, that is, the case in which the ignition is detected within 500 milliseconds, the counter CDigt is cleared by the interrrput routine of the ignition signal and the routine proceeds to Step 124, wherein a judgment is made as to whether the engine is decelerating. This occurs when the engine speed is higher than 1000 rpm and the fuel injection quantity is 5mm$^3$/st or less. When the result of this judgment is positive, as shown in region D in FIG. 6, the lag is great creating a possibility that the ignition timing is mistakenly detected. Therefore, because the fuel injection quantity is low and the wave form of the ignition signal is small, the open loop control as indicated in Step 126, is determined, thus completing the routine.

When the result of judgment in the Step 124 is negative, however, such as the case wherein the ignition signal is detected, and there is no engine deceleration, the routine proceeds to Step 128, wherein the feedback control is determined, thus completing the routine.

When the result of judgment in the Step 122 is positive, such as the case wherein the ignition signal is not detected more than 500 milliseconds, the routine proceeds to Step 130, wherein a judgment is made as to whether an indicated value Qfin of the fuel injection quantity is higher than a preset value, such as 10mm$^3$/st or not. When the result of judgment is positive, the routine proceeds to Step 132, wherein judgment is made as to whether an engine speed Ne is higher than a preset value, such as 1000 rpm or not. When the results of the judgments in Steps 130 or 132 are negative and it is judged that the ignition signal is instable due to adhesion of carbon and the like, as shown in region E in FIG. 6, the routine proceeds to Step 134, wherein the value 49 is entered to the trouble detecting counter CDigt of the ignition timing sensor and the open loop control is determined in the Step 116, thus completing the routine. By presetting the value of CDigt to 49 in Step 134, if no subsequent ignition is made then the value counted by the counter CDigt is incremented to 50, and, when the results of the judgements in Steps 130 or 132 are negative, the open loop control is continued. On the other hand, if the ignition occurs on the way, then the counter CDigt is cleared to zero half-way.

Figure 6:
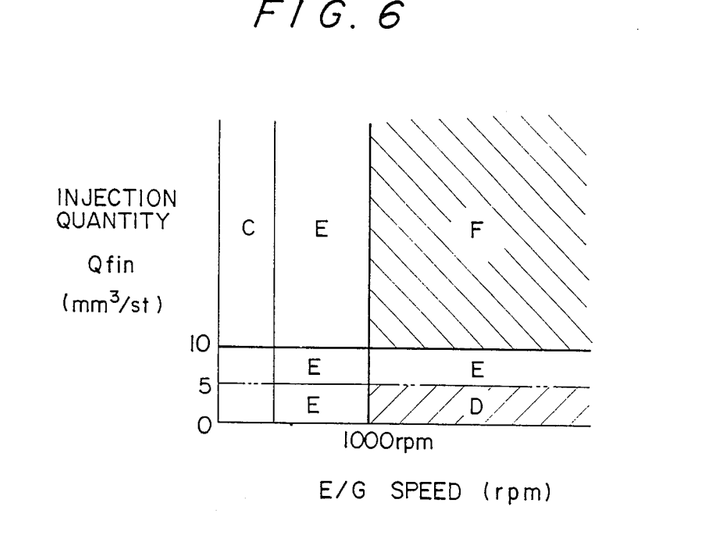
FIG. 6 is a graph depicting the relation between a feedback-control region, an open loop control region and a trouble detection region of the ignition timing sensor in the above embodiment.
Figure 7:
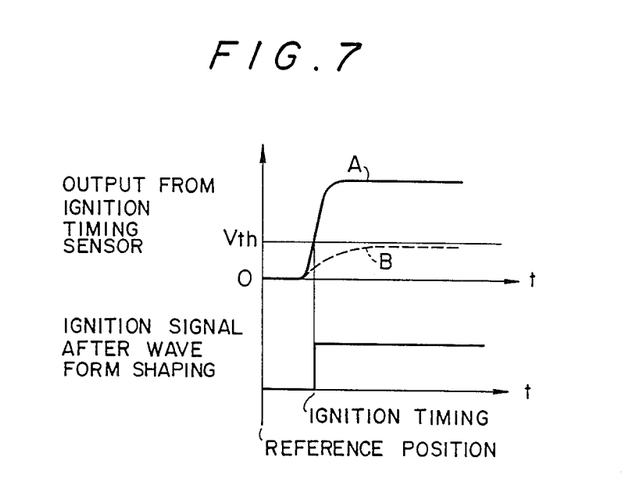
FIG. 7 is a graph of output signals from the ignition timing sensor.

When the result of the judgment in Step 132 is positive, that is, the engine is in the region where the ignition signal is stable, as shown in region F in FIG. 6, the routine proceeds to Step 136, wherein a judgment is made as to whether the value counted by the counter CDigt exceeds a preset value, such as 100 corresponding to one second or not. When the result of this judgment is negative indicating that a time period sufficient for judging the presence of trouble in the ignition timing sensor has not yet elapsed, the routine proceeds to Step 138, wherein a continuance of the feedback control occurs, thus completing the routine. By completing Step 136, a mistaken judgment due to a transient output failure of the ignition timing sensor 38 is avoided.

Alternatively, when the result of the judgment in Step 136 is positive, such as cases wherein the injection quantity indicated value Qfin exceeds 10mm$^3$/st, the engine speed exceeds 1000 rpm and no ignition signal has been detected for at least one second; or cases wherein, after the ignition quantity indicated value Qfin is 10mm$^3$/st or less and the engine speed Ne is less than 1000 rpm, the injection quantity indicated value becomes 10 mm$^3$/st or more and the engine speed Ne exceeds 1000 rpm and no ignition signal has been detected for at least 0.5 seconds, then the routine proceeds to Step 140, indicating the presence of trouble in the ignition timing sensor 38 and enabling open loop control. Further, a warning lamp is turned on and a diag signal is memorized. Subsequently, the routine proceeds to Step 142, wherein the counter CDigt is set to 100, preventing the overflow of the counter CDigt, thus completing the routine.

As shown in FIG. 6 and the above-described processing, the feedback control and the open loop control can be interchanged over due to the presence of the ignition signal and trouble in the ignition timing sensor can be reliably detected.

In this embodiment, the non-perfect explosion operating conditions include times of extremely low engine rotation and the starting time of the engine, enabling the non-perfect explosion conditions to be readily and precisely judged. Additionally, the method of detecting these non-perfect explosion conditions is not limited to this embodiment.

Furthermore, in this embodiment the instable ignition signal operating conditions include the time of deceleration, the time of low engine rotation and the time of low engine load, further enabling instable ignition signal operating conditions can be readily and precisely judged. Additionally, the method of detecting these instable ignition signal operating conditions is not limited to this embodiment.

In this embodiment, the time of deceleration occurs when the engine speed is higher than a preset value and the fuel injection quantity is lower than a preset value, enabling the time of deceleration to be readily and precisely judged. Additionally, the method of detecting the time of deceleration is not limited to this embodiment. Alternatively, the accelerator opening angle Accp, a brake signal and the like can be used.

In the above embodiment, the present invention has been applied to a diesel engine provided with a turbocharger, wherein the fuel injection quantity is controlled by an electromagnetic spill valve 50 of FIG. 2. However, the scope of application of the present invention need not necessarily be limited to this, and it is evident that the present invention is also applicable to ordinary diesel engines provided with a fuel injection quantity control actuator other than an electromagnetic spill valve.

What is claimed is:

1. A method of controlling injection timing in a diesel engine, wherein said injection timing is feedback controlled in accordance with a deviation between a target ignition timing determined on the basis of at least an engine load and an engine speed, and an actual ignition timing detected by use of an ignition timing sensor, said method comprising the steps of:
- (a) detecting the presence of operating conditions indicating when combustion is instable and detection of an ignition signal is difficult;
- (b) effecting an open-loop control based on the engine load and the engine speed when said operating conditions are present;
- (c) effecting said feedback control in response to the ignition signal when said ignition signal is detected, and said operating conditions are not present; and
- (d) effecting said open-loop control and detecting a malfunction of said ignition timing sensor when no ignition signal is detected, and said operating conditions are not present.

2. A method of controlling injection timing in a diesel engine as set forth in claim 1, wherein said operating conditions exist during the time during which the engine is being started.

3. A method of controlling injection timing in a diesel engine as set forth in claim 1, wherein said operating conditions exist during times of engine deceleration, low engine rotation or small fuel injection quantity.

4. A method of controlling injection timing in a diesel engine as set forth in claim 3, wherein said engine deceleration is detected when engine speed is higher than a preset value above an idling speed and said fuel injection quantity is lower than a preset value.

5. A method of controlling injection timing in a diesel engine as set forth in claim 1, wherein said actual ignition timing is detected by an ignition timing sensor at a preset time interval.

6. A method of controlling injection timing in a diesel engine as set forth in claim 1, wherein the presence of a malfunction in said ignition timing sensor is sensed when the conditions indicating trouble continue beyond a preset time period.

7. A method of controlling injection timing in a diesel engine as set forth in claim 6, wherein said preset time period is varied in accordance with a history of engine operating conditions.

8. A system of controlling injection timing in a diesel engine, wherein said injection timing is feedback controlled in accordance with a deviation between a target ignition timing determined on the basis of at least an engine load and an engine speed, and an actual ignition timing detected by use of an ignition timing sensor, said system comprising:
- means for detecting the presence of operating conditions indicating when combusion is instable and the detection of an ignition signal is difficult;
- means for effecting an open-loop control based on the engine load and the engine speed when said operating conditionss are present;
- means for effecting said feed-back control in response to said ignition signal when said ignition signal is detected, and said operating conditions are not present; and
- means for effecting said open-loop control and detecting a malfunction in said ignition timing sensor when no ignition signal is detected, and said operating conditions are not present.

* * * * *